United States Patent
Leum et al.

(10) Patent No.: US 11,577,923 B2
(45) Date of Patent: Feb. 14, 2023

(54) PORTABLE DOCK PLATE

(71) Applicant: Leum Engineering, Inc., Excelsior, MN (US)

(72) Inventors: Grant Leum, Excelsior, MN (US); Eric Demerath, Shepherd, MI (US)

(73) Assignee: Leum Engineering, Inc., Minnetonka, MN (US)

( * ) Notice: Subject to any disclaimer, the term of this patent is extended or adjusted under 35 U.S.C. 154(b) by 34 days.

(21) Appl. No.: 17/101,497

(22) Filed: Nov. 23, 2020

(65) Prior Publication Data

US 2022/0162022 A1 May 26, 2022

(51) Int. Cl.
*B65G 69/30* (2006.01)

(52) U.S. Cl.
CPC .................... *B65G 69/30* (2013.01)

(58) Field of Classification Search
CPC ............................ B62B 3/0642; B62B 3/0643
See application file for complete search history.

(56) References Cited

U.S. PATENT DOCUMENTS

| | | | | |
|---|---|---|---|---|
| 386,355 A | * | 7/1888 | Sheild | B65G 69/30 14/69.5 |
| 2,329,855 A | * | 9/1943 | Rydner | B65G 69/30 193/41 |
| 2,597,213 A | * | 5/1952 | Whiteman | B65G 69/30 280/43.11 |
| 2,659,914 A | * | 11/1953 | Law | B65G 69/30 292/87 |
| 2,670,484 A | * | 3/1954 | Bintliff | B65G 69/30 14/72.5 |
| 2,856,195 A | * | 10/1958 | Ziebarth | B62B 5/02 280/47.27 |
| 2,880,431 A | * | 4/1959 | Noland | B65G 69/30 14/72.5 |
| 3,233,767 A | * | 2/1966 | Goodacre | B66F 7/0625 187/217 |
| 3,639,935 A | * | 2/1972 | Kumpolt | B65G 69/30 14/69.5 |
| 3,939,999 A | * | 2/1976 | Nielson | B62B 3/04 280/47.27 |
| 4,075,729 A | * | 2/1978 | Conner | B65G 69/30 14/72.5 |
| 4,087,876 A | | 5/1978 | Fillman et al. | |
| 4,209,869 A | * | 7/1980 | Trine | B65G 69/30 14/72.5 |

(Continued)

*Primary Examiner* — Gary S Hartmann
(74) *Attorney, Agent, or Firm* — Jansson Munger McKinley & Kirby Ltd.

(57) ABSTRACT

A portable dock plate which includes a planar ramp that has opposing side members, the ramp also has a top end and a bottom end, the top end includes a lip portion. The dock plate has a first wheel assembly and a second wheel assembly. The first wheel assembly includes a wheel, wheel lock linkage, a first locking pin with corresponding first locking pin holes, a lip-lowering apparatus and a lip-raising apparatus. The second wheel assembly has a wheel and a second locking pin with corresponding second locking pin holes. The dock plate also includes opposing handrails which are connected to the opposing side members, each handrail includes a moveable lever-handle for movement and placement of the dock plate.

6 Claims, 9 Drawing Sheets

(56) References Cited

U.S. PATENT DOCUMENTS

| | | | | |
|---|---|---|---|---|
| 4,257,729 | A * | 3/1981 | Morissette | B62B 1/264 |
| | | | | 414/454 |
| 4,442,921 | A * | 4/1984 | Sherman | A61G 3/061 |
| | | | | 187/217 |
| 4,606,090 | A * | 8/1986 | Beard | B65G 69/30 |
| | | | | 14/72.5 |
| 5,065,468 | A | 11/1991 | Sherrod | |
| 5,570,547 | A * | 11/1996 | Webb | B65D 88/08 |
| | | | | 52/192 |
| 7,162,761 | B2 * | 1/2007 | Alexander | B65G 69/2835 |
| | | | | 14/71.3 |
| 8,905,703 | B2 * | 12/2014 | Baechler | B60P 1/4414 |
| | | | | 414/557 |
| 8,992,394 | B2 * | 3/2015 | Mitchell | A63B 21/0724 |
| | | | | 482/93 |
| 9,051,136 | B2 * | 6/2015 | Leum | B65G 69/287 |
| 9,637,328 | B1 * | 5/2017 | Merz | B65G 69/30 |
| 10,118,777 | B1 * | 11/2018 | Tower | B65G 69/30 |
| 2012/0145977 | A1 * | 6/2012 | Hufstater | B66F 5/04 |
| | | | | 254/2 R |
| 2015/0074925 | A1 * | 3/2015 | Levi | B65G 69/30 |
| | | | | 14/72.5 |
| 2017/0327022 | A1 * | 11/2017 | Rasekhi | B60R 3/02 |
| 2020/0120866 | A1 * | 4/2020 | Conrad | A01D 34/74 |

\* cited by examiner

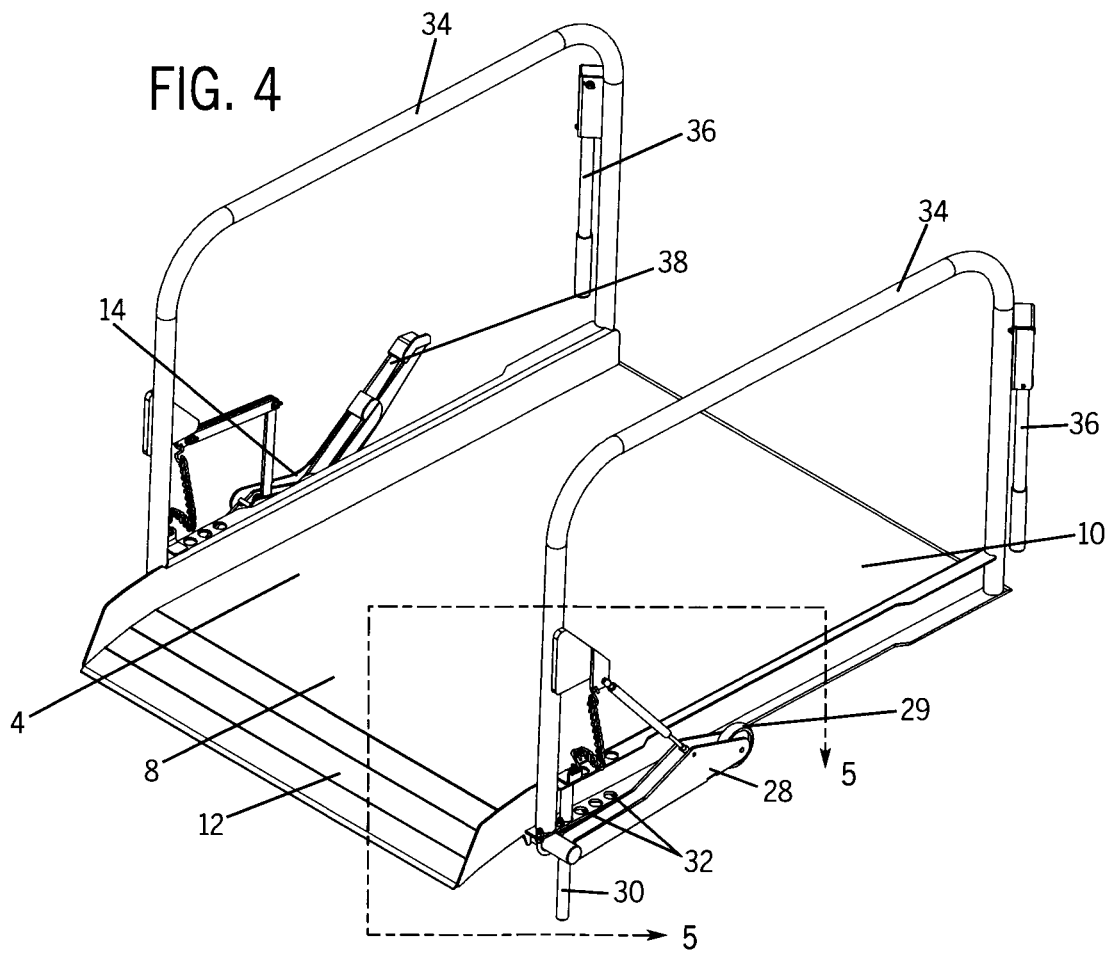
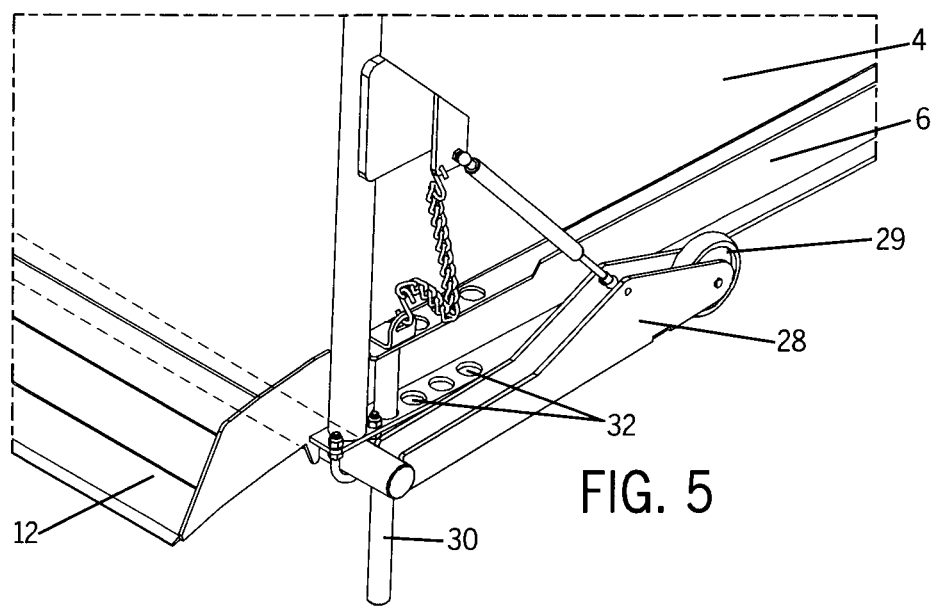

PORTABLE DOCK PLATE

FIELD OF THE INVENTION

This invention relates to a portable dock plate and more particularly to a dock plate which includes hinged handles and a latching system for ease of use.

BACKGROUND OF THE INVENTION

A variety of dock plates have been devised to adjust to the height of different trailers or vehicles to properly match the deck of the trailer or other vehicle to the ground surface. By aligning one end of the dock plate to the height of the trailer, and the other end to the ground surface, the loading and unloading of cargo is facilitated.

One such device is seen in U.S. Pat. No. 4,087,876 to Fillman, et al. which discloses a dock plate that is portable and includes wheels and a handle with sleeve. In operation the dock plate is moved to a truck trailer and goods are loaded and unloaded using the dock plate while it is adjacent to the trailer.

A similar device is disclosed in U.S. Pat. No. 5,065,468 to Sherrod which also discloses a portable dock plate. In addition to the disclosure of Fillman, the device includes the ability to move between operative and inoperative positions by moving the handles.

Some dock plates of the prior art include handles which assist in movement of the device to and from various locations, however, none of these dock plates include a pair of hinged handles which can be stowed and an easy to use latching and unlatching system. It is to this need that this invention is drawn.

This device overcomes certain problems and shortcomings in the prior art, including those mentioned above and others, and provides advantages for a portable dock plate which includes hinged handles as well as a latching system for easy maneuverability and use of the dock plate as not previously provided.

SUMMARY OF THE INVENTION

A portable dock plate which includes a planar ramp member that has opposing side pieces, the ramp member having a top end and a bottom end, the top end including a lip portion; a first wheel assembly including a wheel, wheel lock linkage, a first locking pin with corresponding first locking pin holes, a lip-lowering apparatus and a lip-raising apparatus; a second wheel assembly including a wheel, a second locking pin with corresponding second locking pin holes; and opposing handrails being connected to the opposing side pieces, each handrail including a moveable lever-handle for movement and placement of the dock plate.

In highly-preferred embodiments the lip-lowering apparatus and lip-raising apparatus are each structurally separate foot-activated pedals. The preferred method of activating the foot-activated pedals, is to have a user step on a corresponding foot-activated pedal to lower the lip and to step on a different corresponding foot-activated pedal to raise the lip.

Highly-preferred embodiments also include that a user presses down on the lip-raising apparatus to raise the lip of the portable dock plate off of the ground and to lock the wheels. It is also highly-preferred that a user presses down on the lip-lowering apparatus to unlock the wheels and to lower the lip of the portable dock plate onto a vehicle cargo area once the portable dock plate is positioned adjacent to the vehicle cargo area.

The portable dock plate preferably includes a connection member which connects the first wheel assembly and the second wheel assembly. It is highly preferred that the first wheel assembly and second wheel assembly are able to be actuated together. Preferably the moveable lever-handle can be in either a raised position or a stowed position.

BRIEF DESCRIPTION OF THE DRAWINGS

The drawings illustrate preferred embodiments including the above-noted characteristics and features of the device. The device will be readily understood from the descriptions and drawings. In the drawings:

FIG. 4 is a perspective view of the portable dock plate of FIG. 1;

FIG. 5 is a cutaway view taken along line 5-5 of FIG. 4;

DETAILED DESCRIPTION OF PREFERRED EMBODIMENTS

FIGS. 1-15 illustrate a portable dock plate 2 with a planar ramp 4 and integral handles 36 as well as a foot-activated latching mechanism.

Figure 1:
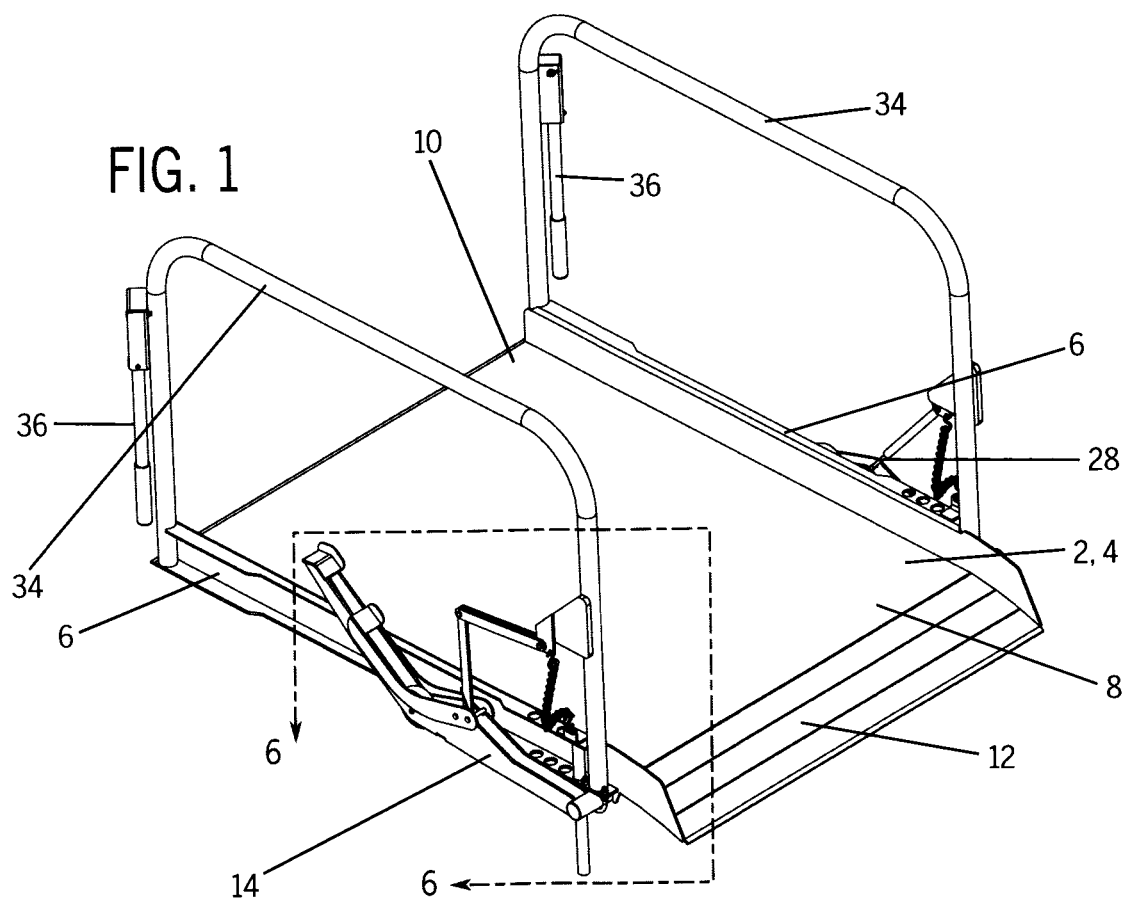
FIG. 1 is a perspective view of a portable dock plate.

FIG. 1 illustrates that planar ramp has two, opposing side members 6 and that planar ramp 4 as a top end 8 and a bottom end 10. Top end 8 includes a lip portion 12 which contacts the vehicle-cargo area 46 of a vehicle 48. As seen in FIG. 1, dock plate 2 has a first wheel assembly 14 with a first wheel 16, wheel lock linkage 18, a first locking pin 20 with corresponding first locking pin holes 22 as well as a lip-lowering apparatus 24 and a lip-raising apparatus 26. On the opposing side member 6 from first wheel assembly 14 is a second wheel assembly 28. Second wheel assembly 28 includes a second wheel 29, a second locking pin 30 with corresponding second locking pin holes 32.

Opposing handrails 34 are each connected to an opposing side member 6 as seen in FIG. 1. Each handrail 34 has a lever-handle 36 connected to it for movement and placement of dock plate 2.

Figure 2:
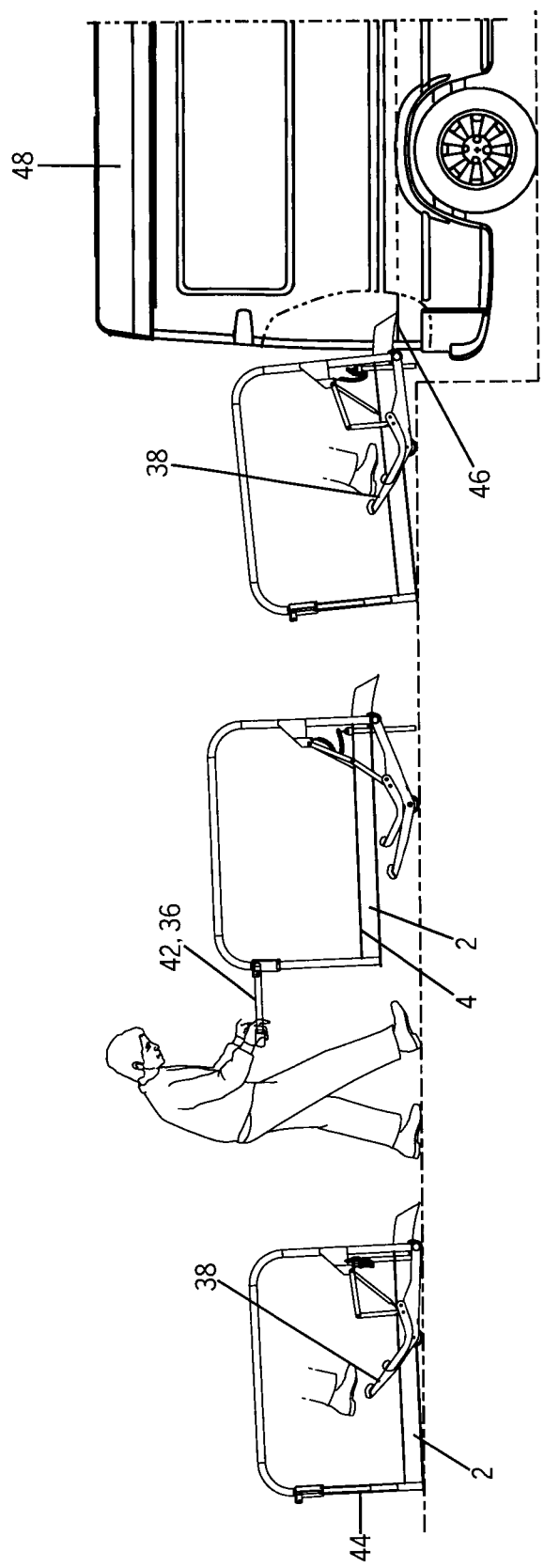
FIG. 2 is a series of perspective views of the portable dock plate of FIG. 1.

FIG. 2 illustrates how a user can move dock plate 2 from a resting position to a moving position through the use of a pair of lever handles 36 which can be in a stowed position 44 (as seen on the far left of FIG. 2) or in a raised position 42 (as seen in the middle of FIG. 2). When a user wants to use lever handles 36, lever handles 36 are pulled in an upward and inward (toward the centerline of dock plate 2)

direction. This allows easy use of lever handles 36 to move dock plate 2 into a desired position.

FIG. 2 also illustrates the use of the foot-activated pedals 38 which raise and lower portable dock plate 2 so that it can be easily moved. On the far right of FIG. 2, portable dock plate 2 is shown moved into position so that it contacts the vehicle-cargo area 46 of a vehicle 48 so that cargo can be loaded and/or unloaded.

Figure 3:
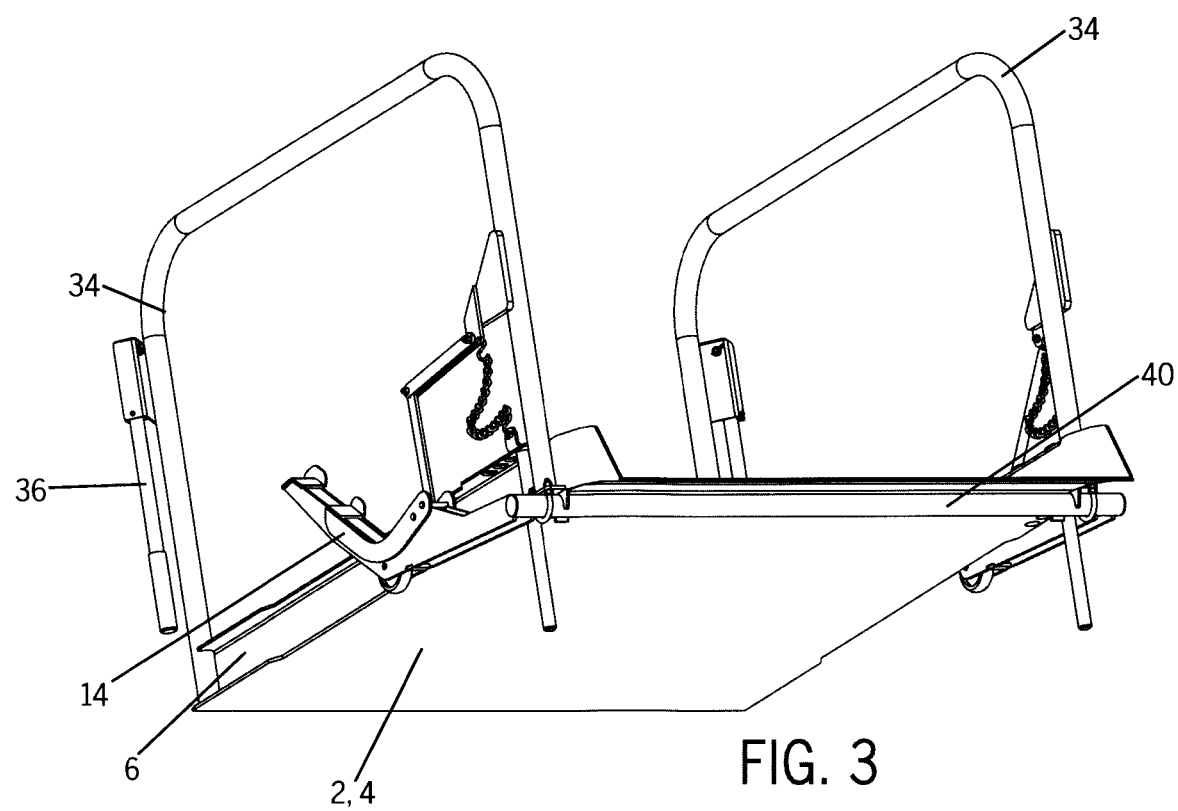
FIG. 3 is a perspective view of the underside of the portable dock plate of FIG. 1.

FIG. 3 illustrates the underside of planar ramp 4 as well as first wheel assembly 14 and second wheel assembly 28. Lever handle 36 is shown in the stowed position 44. A connection member 40 is shown in FIG. 3. Connection member 40 connects first wheel assembly 14 and second wheel assembly 28 so that first wheel assembly 14 and second wheel assembly 28 are able to be actuated together at the same time.

FIGS. 4-7 show dock plate 2 in more detail, specifically first wheel assembly 14 and second wheel assembly 28. FIG. 4 illustrates the main components of portable dock plate 2 including planar ramp 4, opposing side members 6 and first wheel assembly 14 and second wheel assembly 28. Both first wheel assembly 14 and second wheel assembly 28 include a retention chain (not claimed).

FIG. 5 shows the detail of second wheel assembly 28. Specifically FIG. 5 illustrates that second wheel assembly 28 includes second wheel 29, second locking pin 30 and the corresponding second locking pin holes 32 that second locking pin 30 fits into. Second wheel assembly 28 also includes a gas spring (not claimed).

Figure 6:
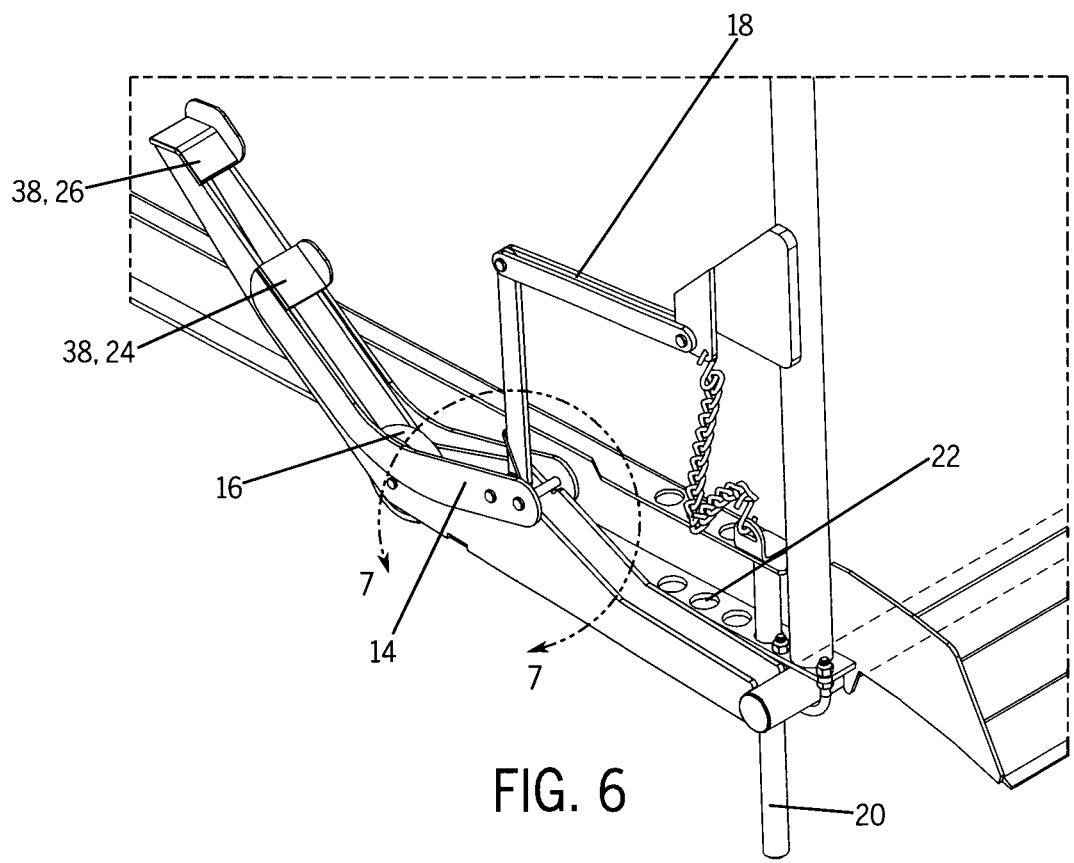
FIG. 6 is a cutaway view taken along line 6-6 of FIG. 1.
Figure 7:
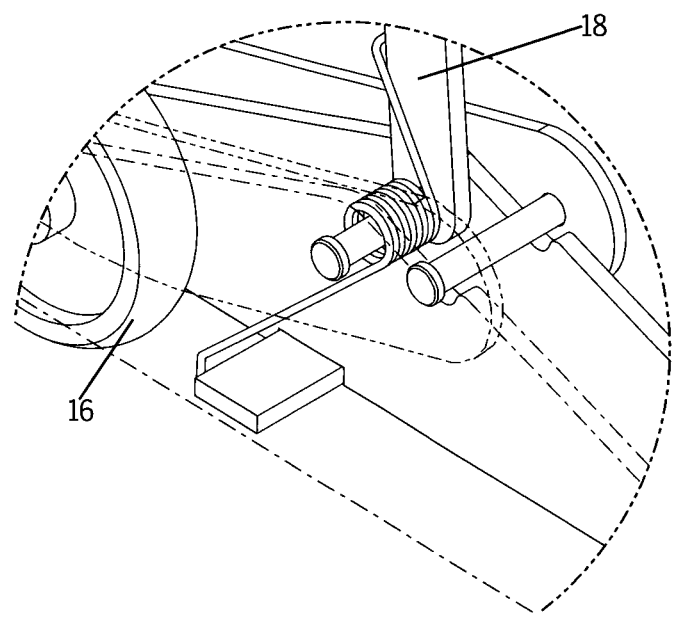
FIG. 7 is a cutaway view taken along line 7-7 of FIG. 6.

FIGS. 6-7 show in detail the structure of first wheel assembly 14. Specifically, FIG. 6 illustrates the two foot-activated pedals 38 of dock plate 2. 5 one foot-activated pedal 38 is a pedal which lowers lip portion 12 when it is pushed down on by a user's foot. The lip-lowering pedal is designated by reference number 24. The other adjacent pedal is a lip-raising pedal 26 that raises lip portion 12 when the pedal is depressed by a user's foot. Lip-lowering apparatus (pedal) 24 and lipraising apparatus (pedal) 26 are each structurally-separate foot-activated pedals 38.

When a user presses down on lip-raising apparatus 26 it causes lip portion 12 of portable dock plate 2 to raise off of the ground and to lock both first wheel 16 and second wheel 29. When a user presses down on lip-lowering apparatus 24 to unlock first wheel 16 and second wheel 29, it also lowers lip portion 12 of portable dock plate 2 onto a vehicle-cargo area 46 once portable dock plate 2 is positioned adjacent to vehicle-cargo area 46.

FIG. 7 illustrates wheel lock linkage 18 in more detail including release the latch spring 50 and pins 52.

Figure 8:
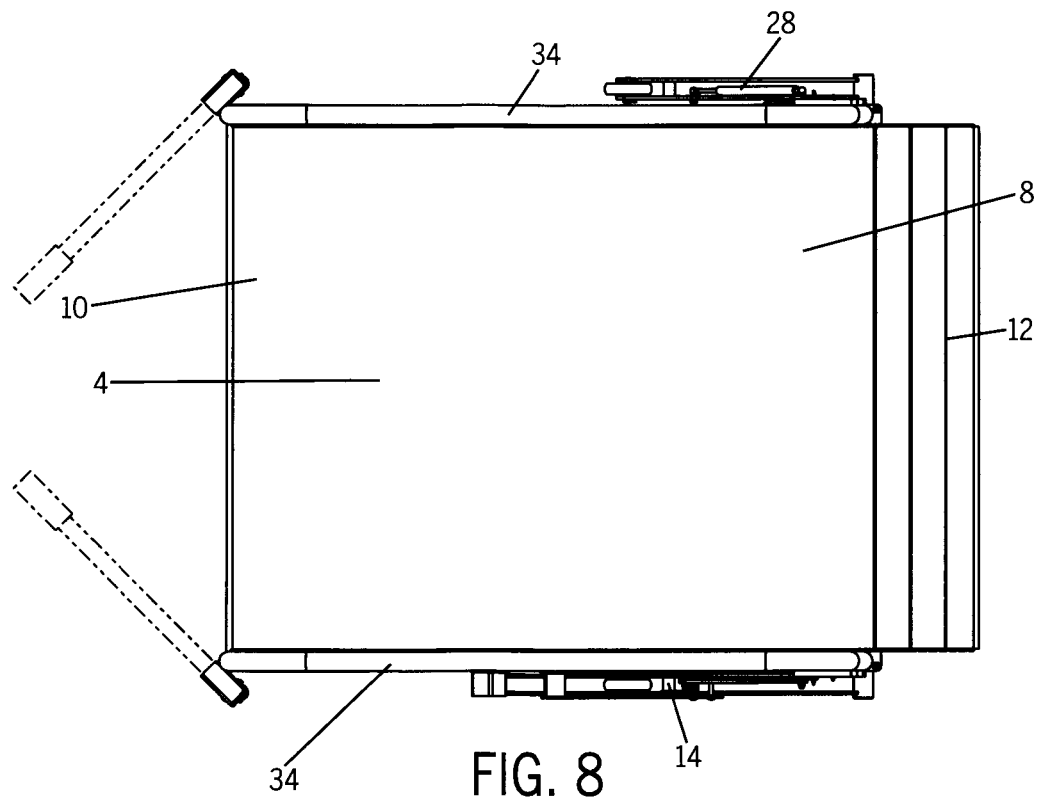
FIG. 8 is a top view of the portable dock plate of FIG. 1.
Figure 9:
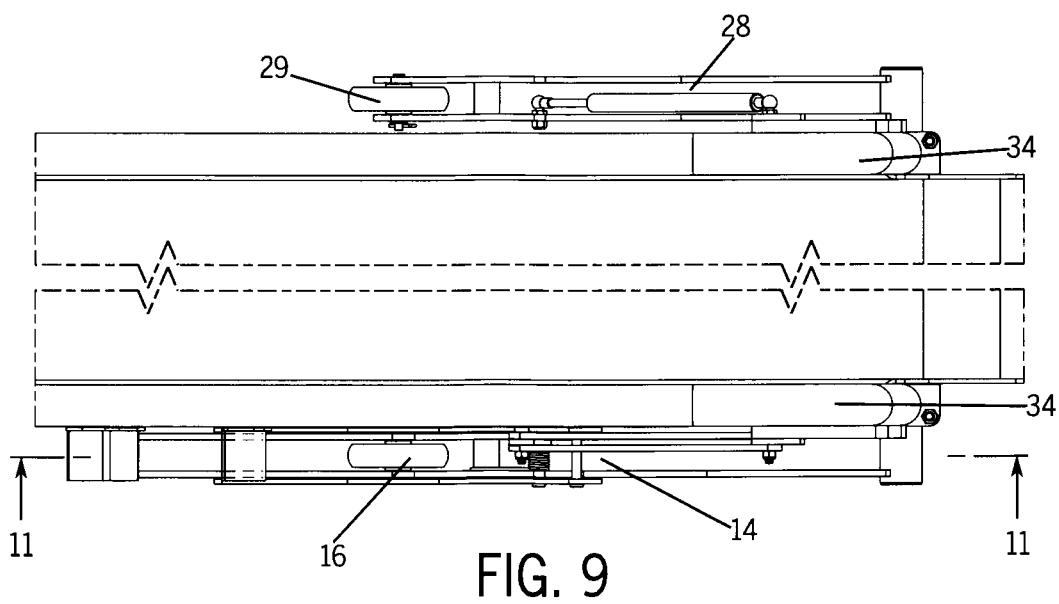
FIG. 9 is a top view of the first and second wheel assemblies of the portable dock plate of FIG. 1.

Planar ramp 4 is shown in FIG. 8 with opposing handrails 34 as well as top end 8 and bottom end 10. First wheel assembly 14 and second wheel assembly 28 are also seen in both FIGS. 8 and 9.

Figure 10:
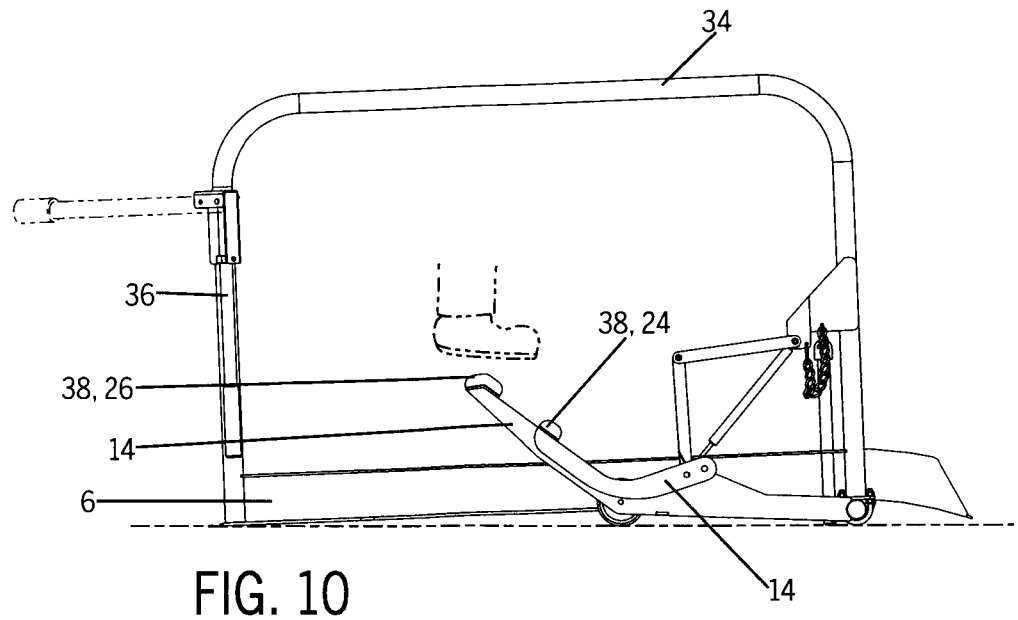
FIG. 10 is a side view of the first wheel assembly of the portable dock plate of FIG. 1.
Figure 11:
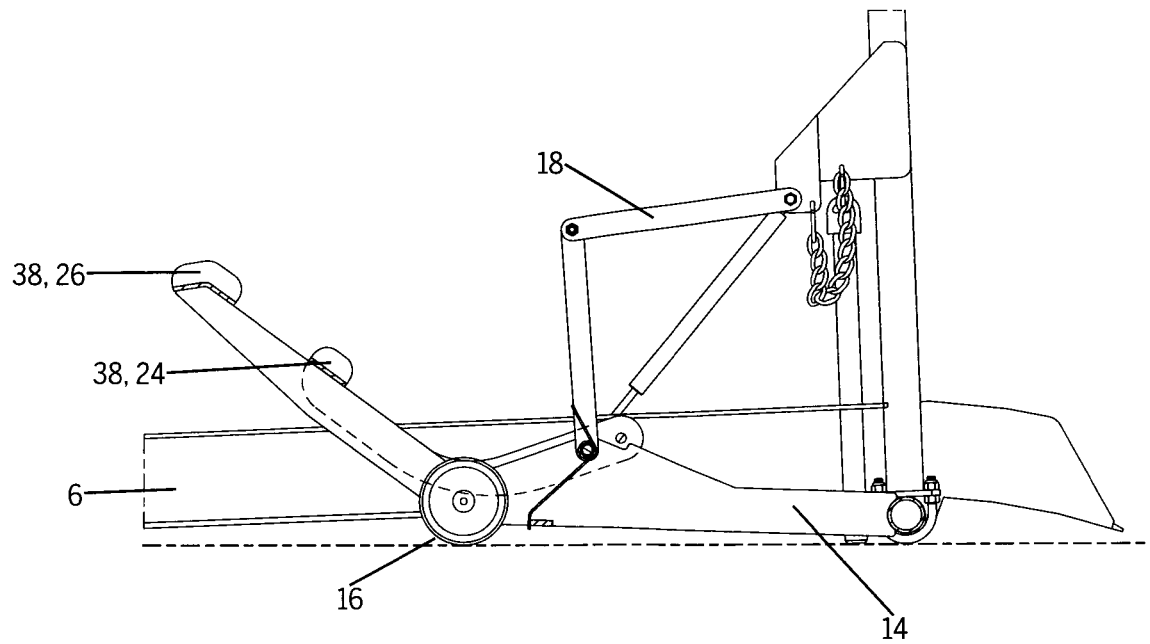
FIG. 11 is a close up view of the first wheel assembly of the portable dock plate of FIG. 1.

FIG. 10 illustrates how foot-activated pedal 38 is used, specifically lip-raising apparatus 26. FIG. 11 shows in detail first wheel assembly 14 including release latch spring 50 and pins 52 as well as wheel lock linkage 18.

Figure 12:
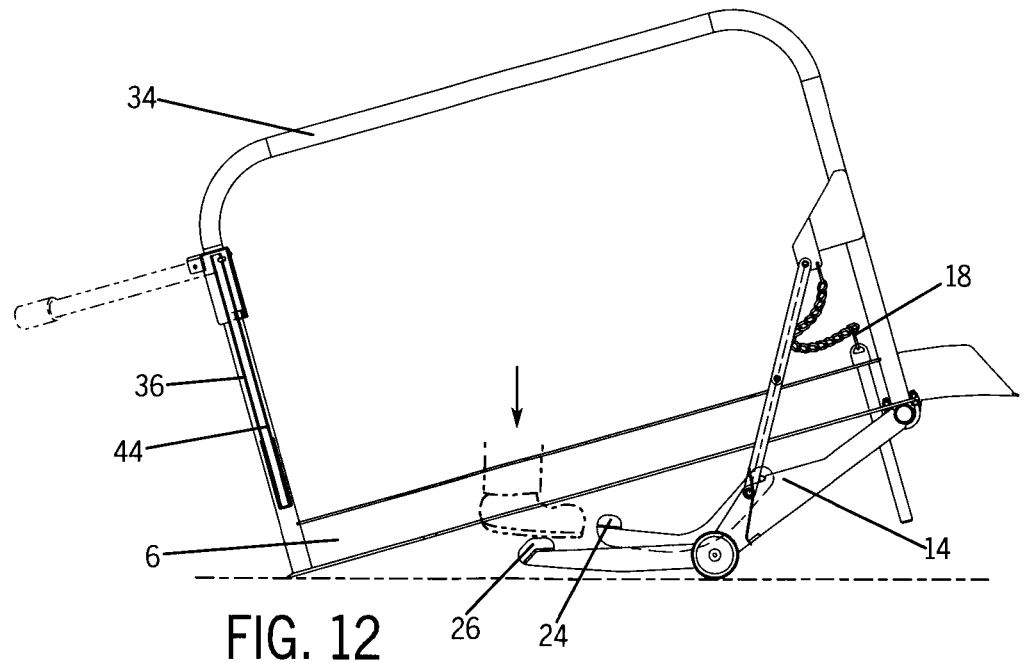
FIGS. 12-13 are side views of the portable dock plate of FIG. 1 showing a user using a foot-activated pedal.
Figure 13:
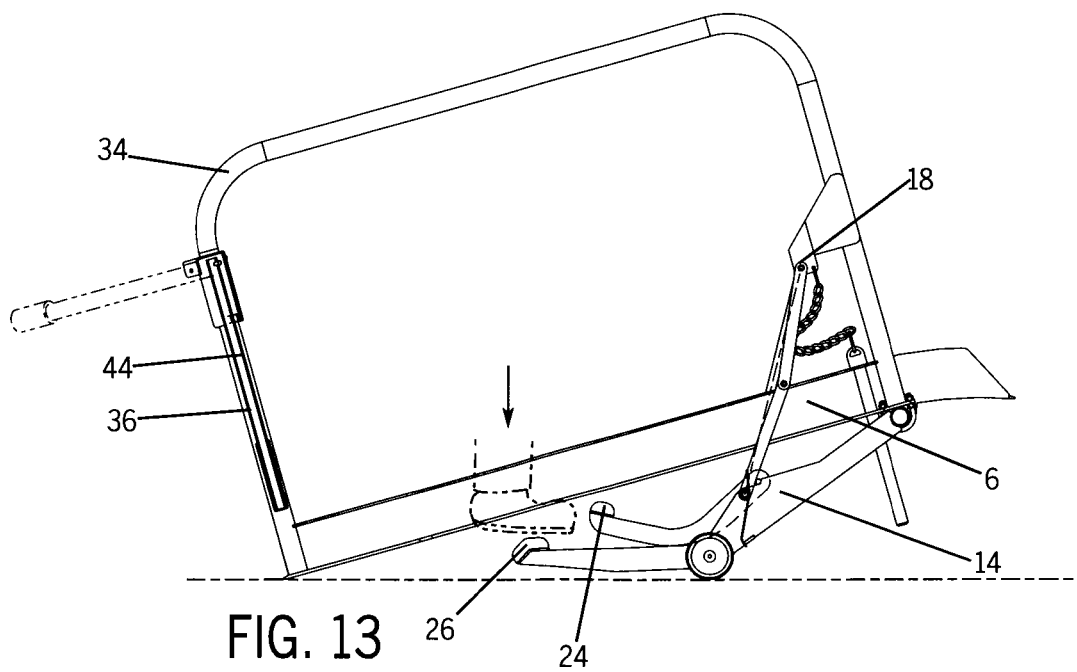

FIGS. 12-13 show portable dock plate 2 as foot-activated pedal 38 for lip-raising apparatus 26 is pushed by a user's foot. Arrows in both FIGS. 12-13 indicate that the lip-raising apparatus (pedal) 26 is being pushed downward. FIGS. 12-13 also illustrate the change in position with wheel lock linkage 18 when lip-raising apparatus (pedal) 26 is pushed downward. Lip portion 12 of portable dock plate 2 in FIGS. 12-13 is raised off of the ground and both first wheel 16 and second wheel 29 are locked.

Figure 14:
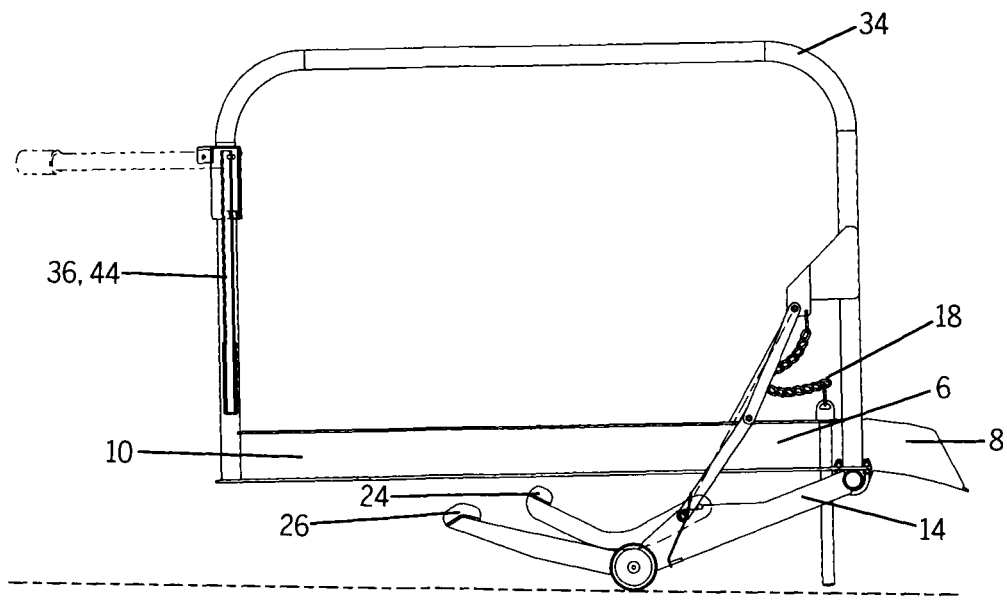
FIG. 14 is a side view of the portable dock plate of FIG. 1 showing the top end and bottom end raised off of the ground.

FIG. 14 illustrates portable dock plate 2 in a mobile position as both top end 8 and bottom end 10 of planar ramp 4 are not contacting the ground surface. Only first wheel 16 and second wheel 29 are in contact with the surface in FIG. 14.

Figure 15:
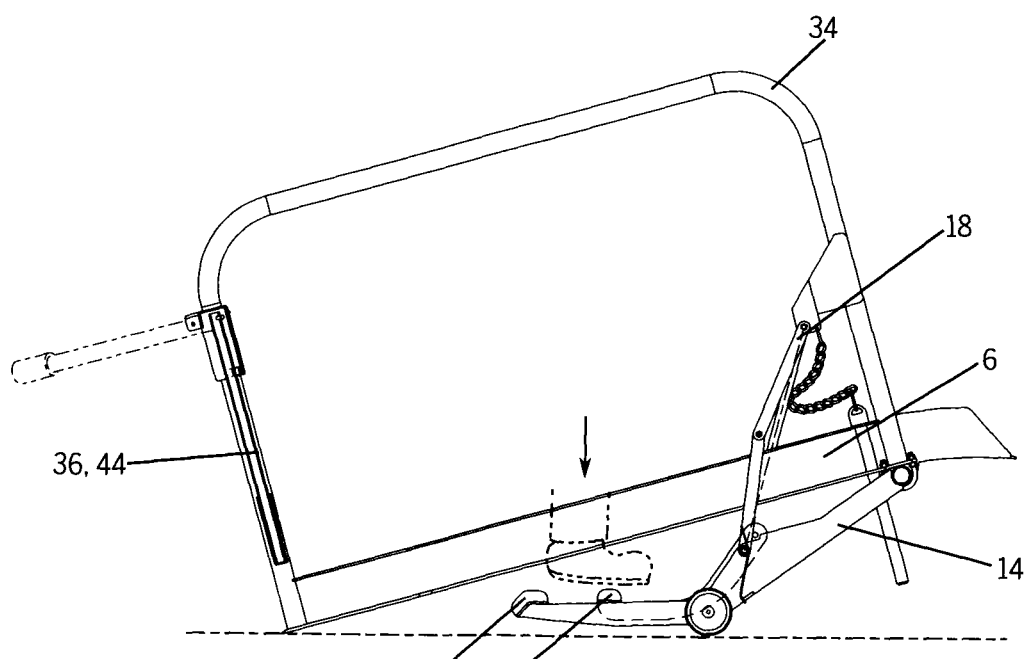
FIG. 15 is a side view of the portable dock plate of FIG. 1 showing a user using a foot-activated pedal.

FIG. 15 illustrates a user pushing foot-activated pedal 38 for lip-lowering apparatus 24. The arrow in FIG. 15 illustrates the direction in which the user's foot is pushing pedal 38. Wheel lock linkage 18 in FIG. 15 is shown in a different position than in FIGS. 12-14 because lip-lowering apparatus 24 (pedal) is being depressed. In FIG. 15 both first wheel 16 and second wheel 29 are now unlocked and lip portion 12 can be positioned into a vehicle-cargo area 46.

In some embodiments lip-lowering apparatus (pedal) 24 is red in color and lip-raising apparatus (pedal) 26 is green in color to further differentiate to a user the difference between the two pedals. It should be noted though that all colors and styles for the pedals are within the scope of the application.

Foot-activated pedals 38 allow for a user to raise and lower planar ramp 4, specifically lip portion 12, without having to bend over and adjust mechanisms on a dock plate to drag it into the desired position. Lever handles 36 are moveable and can be in a stowed position 44 or a raised position 42. When lever handles 36 are in raised position 44 a user can easily use lever handles 36 to move portable dock plate 2 into any desired position to facilitate the loading or unloading of cargo.

To operate portable dock plate 2 a user would first press down on the green footpad (lip-raising apparatus 24) until lip portion 12 of planar ramp 4 is raised off the ground and first wheel 16 and second wheel 29 are locked. Next, the user would pull both lever handles 36 out from their stowed position 44 to a raised position 42 and then raise portable dock plate 2 until the bottom end 10 of planar ramp 4 is a few inches off the ground. Using lever handles 36, user would then push portable dock plate 2 into position behind a vehicle so that lip portion 12 rests on vehicle-cargo area 46. User must then ensure that first locking pin 20 and second locking pin 30 are positioned above the gap between vehicle 48 and the loading area. User may need to reposition first locking pin 20 and second locking pin 30 by pulling them out and dropping them into one of the corresponding first locking pin holes 22 and second locking pin holes 32.

Next, user lowers portable dock plate 2 by pressing down on the red footpad (lip-lowering apparatus 26) until wheel linkage 18 disengages. Lip portion 12 will lower slowly onto vehicle-cargo area 46. User will again verify that first locking pin 20 and second locking pin 30 are inserted in a first locking pin hole 22 and second locking pin hole 32 which is between the dock and vehicle 48. Portable dock plate 2 may now be used for loading and unloading.

When loading/unloading is finished, user presses down on the green footpad (lip-raising apparatus 24) until lip portion 12 of planar ramp 4 is raised off the ground and user can then pull portable dock plate 2 away from the vehicle.

Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A portable dock plate comprising:
   a planar ramp including opposing side members, the ramp having a top end and a bottom end, the top end including a lip portion;

a first wheel assembly including a first wheel, wheel lock linkage, a first locking pin with corresponding first locking pin holes, a lip-lowering apparatus and a lip-raising apparatus, the lip-lowering apparatus being a first foot-activated pedal and the lip-raising apparatus being a second foot-activated pedal, the first foot-activated pedal is structurally separate and independent from the second foot-activated pedal;

a second wheel assembly including a second wheel, a second locking pin with corresponding second locking pin holes; and opposing handrails each being connected to the opposing side members, each handrail including a moveable lever-handle for movement and placement of the dock plate;

wherein the first and second foot-activated pedals when in operation together raise and lower the lip portion, raise and lower the planar ramp and lock the first wheel and second wheel in a desired position.

2. The portable dock plate of claim 1 further including a connection member which connects the first wheel assembly and the second wheel assembly, the first wheel assembly and second wheel assembly are able to be actuated together.

3. The portable dock plate of claim 1 wherein a user steps on a corresponding foot-activated pedal to lower the lip and steps on a different corresponding foot-activated pedal to raise the lip.

4. The portable dock plate of claim 1 wherein the moveable lever-handle can be in either a raised position or a stowed position.

5. The portable dock plate of claim 1 wherein a user presses down on the lip-raising apparatus to raise the lip of the portable dock plate off of the ground and to lock the wheels.

6. The portable dock plate of claim 1 wherein a user presses down on the lip-lowering apparatus to unlock the wheels and to lower the lip of the portable dock plate onto a vehicle cargo area once the portable dock plate is positioned adjacent to the vehicle cargo area.

\* \* \* \* \*